United States Patent Office 3,445,512
Patented May 20, 1969

3,445,512
PURIFICATION OF ADIPIC ACID
Francis George Webster and Dereck James Sutherland Burleigh, Manchester, England, assignors to Imperial Chemical Industries Limited, London, England, a corporation of Great Britain
No Drawing. Filed Aug. 18, 1966, Ser. No. 588,641
Claims priority, application Great Britain, Aug. 20, 1965, 35,782/65
Int. Cl. C07c 55/14
U.S. Cl. 260—537                                                3 Claims This invention relates to the purification of adipic acid obtained by the oxidation of cyclohexane.

Adipic acid is manufactured in large quantities as the starting material for the production of polyhexamethylene adipamide and other polymers. Usually cyclohexane is employed as the starting point for adipic acid manufacture, and the adipic acid may be obtained by oxidation of the cyclohexane conveniently in two stages; first a mixture of products rich in cyclohexanol and cyclohexanone is obtained by subjecting the cyclohexane to oxidation with molecular oxygen or its mixtures such as air, and secondly subjecting the initial oxidation mixture to further oxidation with nitric acid. Such processes are further described in U.S. Patent No. 2,703,331 and U.K. patent specification Nos. 633,354, 767,348 and 914,510.

The adipic acid obtained by such processes is contaminated with other acids and if these contaminants are not removed the properties of the polymers obtained from the adipic acid are unsatisfactory. Monobasic acids, especially caproic acid, are particularly difficult to remove in an economic manner by conventional means, such as recrystallisation from aqueous solution or steam stripping at atmospheric pressure.

According to the invention we provide a process for purification of adipic acid obtained by oxidation of cyclohexane said process comprising contacting an aqueous solution of the said adipic acid with steam in a contacting zone, at elevated pressure, permitting steam to issue from the contacting zone whereby to remove monobasic acids therefrom and thereafter recovering purified adipic acid by crystallisation.

It is found preferable to maintain the pressure at which the aqueous adipic acid is contacted with steam at from 20 to 80 p.s.i.g. Between these pressures the monobasic acids present with the adipic acid can be stripped from the aqueous adipic acid by the steam with high efficiency and at low cost without decomposition of the adipic acid.

If desired the process of the invention may be operated by heating an aqueous solution of the said adipic acid to the boiling point in a vessel having an exit fitted with a valve adapted to maintain elevated pressure inside the vessel. Preferably however the process of the invention is carried out by passing high pressure steam into an aqueous solution of the said adipic acid in such a vessel.

The monobasic acid-laden steam leaving the contacting zone may be used to generate steam at a lower pressure by use of a suitable heat exchanger, and further thermal economy is possible by counter current heat exchange between the hot adipic acid solution leaving the contacting zone and the adipic acid solution fed to the contacting zone.

If desired part of the condensate obtained by condensing steam issuing from the contacting zone may be contacted with the contaminated steam leaving the contacting zone to remove monobasic acid from this part of the condensate and the hot water so obtained may then be re-used in the adipic acid purification process, for example as a solvent for crude adipic acid.

The invention is illustrated by the following examples in which the parts are by weight.

EXAMPLE 1

33 parts of impure adipic acid, made by the nitric acid oxidation of the product of cyclohexane air oxidation, were dissolved in water to give 100 parts of solution and heated in a vessel under pressure to 110° C. This solution was delivered at a steady rate to the top of a steam heated column 4 inches in diameter charged with ⅜ in. x ⅜ in. stoneware Raschig rings to a depth of 12 ft. Steam was admitted to the bottom of the column at a rate 2 parts per part of adipic acid in the solution entering.

The steam passed up the column counter-current to the downward flow of adipic acid solution and was released from the top of the column through a let-down valve to a condenser. By adjustment of the let-down valve the pressure in the column was held at 40 p.s.i.g. The adipic acid solution from the base of the column was collected in a receiver.

A sample of the solution was treated with decolourising carbon at 90° C. filtered and cooled to 30° C. The resulting adipic acid crystals were filtered off, and washed with water.

The washed adipic acid contained approximately 5 p.p.m. of steam volatile acid (calculated as valeric acid), on a dry basis.

By operating at a pressure of 20 p.s.i.g. and using 2.8 parts of steam per part of adipic acid a product of similar purity to the above was obtained.

A similar result was also obtained by operating at a pressure of 80 p.s.i.g. and using 1.0 part of steam per part of adipic acid.

EXAMPLE 2

A similar experiment to the above but with the column operated at atmospheric pressure and using 2.2 parts of steam per part of adipic acid gave a final washed adipic acid containing 25 p.p.m. of steam volatile acid.

EXAMPLE 3

A further experiment in which the column was operated at atmospheric pressure using 3.3 parts of steam per part of adipic acid gave a final washed adipic acid containing approximately 5 p.p.m. of steam volatile acid.

From the above examples it is apparent that operation at elevated pressure decreases the steam requirement per lb. of adipic acid for a given degree of purification.

With the omission of the steam stripping stage the final washed adipic acid contained 50 p.p.m. of steam volatile acid.

We claim:
1. A process for purification of adipic acid obtained by oxidation of cyclohexane said process comprising contacting an aqueous solution of the said adipic acid with steam in a contacting zone at a pressure of 20 to 80 p.s.i.g. permitting steam to issue from the contacting zone whereby to remove monobasic acids therefrom and thereafter recovering purified adipic acid by crystallisation.

2. A process according to claim 1 when carried out by passing high pressure steam into an aqueous solution of the said adipic acid in a vessel having an exit fitted with a valve adapted to maintain a pressure of 20 to 80 p.s.i.g. inside the vessel.

3. A process according to claim 2 wherein part of the condensate obtained by condensing steam issuing from the contacting zone is contacted with steam issuing from the contacting zone to strip monobasic acid from the said part of the condensate and the hot water so obtained is reused in the purification process as a solvent for adipic acid.

References Cited

UNITED STATES PATENTS

| | | | |
|---|---|---|---|
| 2,617,835 | 11/1952 | Curtin | 260—537 |
| 2,773,094 | 12/1956 | Englert et al. | 260—537 |
| 2,703,331 | 3/1955 | Goldbeck et al. | 260—537 |
| 3,365,490 | 1/1968 | Arthur et al. | 260—537 |

JAMES A. PATTEN, *Primary Examiner.*

V. GARNER, *Assistant Examiner.*

U.S. Cl. X.R.

260—531, 533, 540